United States Patent
Ciaccio (10) Patent No.: US 10,263,300 B2
(45) Date of Patent: Apr. 16, 2019

(54) BATTERY PACK INCLUDING FLUID RESISTANT OVER MOLD

(71) Applicant: A123 Systems LLC, Waltham, MA (US)

(72) Inventor: Michael P. Ciaccio, Chelsea, MI (US)

(73) Assignee: A123 Systems LLC, Waltham, MA (US)

( * ) Notice: Subject to any disclaimer, the term of this patent is extended or adjusted under 35 U.S.C. 154(b) by 454 days.

(21) Appl. No.: 14/377,138

(22) PCT Filed: Feb. 7, 2013

(86) PCT No.: PCT/US2013/025158
§ 371 (c)(1),
(2) Date: Aug. 6, 2014

(87) PCT Pub. No.: WO2013/119818
PCT Pub. Date: Aug. 15, 2013

(65) Prior Publication Data
US 2014/0356651 A1    Dec. 4, 2014

Related U.S. Application Data

(60) Provisional application No. 61/596,624, filed on Feb. 8, 2012.

(51) Int. Cl.
*H01M 2/10* (2006.01)
*H01M 10/647* (2014.01)
(Continued)

(52) U.S. Cl.
CPC ....... *H01M 10/625* (2015.04); *H01M 2/1077* (2013.01); *H01M 10/425* (2013.01); *H01M 10/482* (2013.01); *H01M 10/63* (2015.04); *H01M 10/647* (2015.04); *H01M 10/6568* (2015.04); *H01M 10/667* (2015.04); *H01M 2/1094* (2013.01); *H01M 10/6554* (2015.04); *H01M 2010/4271* (2013.01); *H01M 2200/103* (2013.01); *H01M 2220/20* (2013.01)

(58) Field of Classification Search
CPC .................................................. H01M 2/1077
See application file for complete search history.

(56) References Cited

U.S. PATENT DOCUMENTS

| 6,168,470 B1 * | 1/2001 | Ikeda | H01M 2/206 439/620.08 |
| 2004/0106038 A1 * | 6/2004 | Shimamura | H01M 2/021 429/152 |

(Continued)

FOREIGN PATENT DOCUMENTS

| WO | WO 2010121832 | * 10/2010 |
| WO | 2011082226 A2 | 7/2011 |

OTHER PUBLICATIONS

ISA Korean Intellectual Property Office, International Search Report and Written Opinion of PCT/US2013/025158, WIPO dated May 29, 2013, 13 pages.

*Primary Examiner* — Jonathan Crepeau
(74) *Attorney, Agent, or Firm* — McCoy Russell LLP (57) ABSTRACT

A battery pack for supplying energy to propel a vehicle is disclosed. In one example, a battery pack includes a thermoplastic over mold for providing resistance to liquid is disclosed. The battery pack may have increased resistance to battery pack degradation.

20 Claims, 6 Drawing Sheets

(51) Int. Cl.
*H01M 10/6568* (2014.01)
*H01M 10/42* (2006.01)
*H01M 10/48* (2006.01)
*H01M 10/625* (2014.01)
*H01M 10/63* (2014.01)
*H01M 10/667* (2014.01)
*H01M 10/6554* (2014.01)

(56) References Cited

U.S. PATENT DOCUMENTS

| | | | |
|---|---|---|---|
| 2006/0251960 A1 | 11/2006 | Yoon et al. | |
| 2008/0199765 A1* | 8/2008 | Yoon | H01M 2/1072 429/91 |
| 2010/0019733 A1* | 1/2010 | Rubio | G01R 1/203 320/136 |
| 2010/0055993 A1* | 3/2010 | Ikeda | H01M 2/1077 439/754 |
| 2010/0136444 A1 | 6/2010 | Nash | |
| 2011/0151303 A1 | 6/2011 | Cherng et al. | |
| 2011/0151305 A1 | 6/2011 | Bolze et al. | |
| 2011/0159336 A1* | 6/2011 | Ohkura | H01M 2/1077 429/99 |
| 2011/0206948 A1* | 8/2011 | Asai | H01M 2/0473 429/7 |
| 2012/0171908 A1* | 7/2012 | Henmi | H01M 2/1083 439/761 |
| 2012/0183823 A1* | 7/2012 | Von Borck | H01M 2/1061 429/81 |

* cited by examiner

BATTERY PACK INCLUDING FLUID RESISTANT OVER MOLD

CROSS REFERENCE TO RELATED APPLICATIONS

This application claims priority from International Patent Application Serial No. PCT/US2013/025158, filed Feb. 7, 2013 and entitled BATTERY PACK INCLUDING FLUID RESISTANT OVER MOLD, which claims priority to U.S. Provisional Patent Application Ser. No. 61/596,624, filed Feb. 8, 2012 and entitled BATTERY PACK INCLUDING FLUID RESISTANT OVER MOLD, the entirety of both which are hereby incorporated herein by reference for all intents and purposes.

TECHNICAL FIELD

The present description relates to reducing the possibility of degradation of a battery pack. In one example, the battery pack provides power to a vehicle and is liquid cooled.

BACKGROUND AND SUMMARY

Vehicle battery packs may include a plurality of battery cells combined in series and/or in parallel to supply power to propel a vehicle. Battery cells that are combined in series increase output voltage of the battery pack while battery cells that are combined in parallel increase the amp-hour rating of the battery pack. Individual battery cells within the battery pack may from time to time output a voltage that is different from other battery cells of the battery pack. Additionally, the charge storage capacity of some battery cells within the battery pack may be greater or less than the charge storage capacity of other battery cells within the battery cell pack. However, the output capacity and storage capacity of a battery pack may be increased when all battery cells within a battery pack are operated at substantially the same level of charge.

One way to provide substantially equivalent charge between battery cells of a battery pack is to monitor battery cell charge and increase or drain charge of individual battery cells that are not at a desired charge level. However, the possibility of battery pack degradation may increase if battery cell charge is routed to a charge monitoring and charge balancing board that is remote from the individual battery cells. Further, the possibility of battery pack degradation may increase when the battery pack is liquid cooled or if liquid enters the battery pack unintentionally. Therefore, it may be desirable to provide a battery pack that includes charge monitoring and balancing with reduced possibility of battery pack degradation.

The inventor herein has recognized the above limitations and has developed an approach to address them. In one approach, a battery pack, comprising: a plurality of non-aqueous electrolyte battery cells; a liquid cooling circuit including a liquid heat transfer medium, the liquid cooling circuit in thermal communication with at least one of the plurality of non-aqueous electrolyte battery cells; electrical circuitry in electrical communication with the plurality of non-aqueous electrolyte battery cells; and a fluid resistant over mold encapsulating at least a portion of the electrical circuitry away from the liquid heat transfer medium.

By over molding conductors with a fluid resistant medium within a liquid cooled battery pack, it may be possible to reduce degradation within a battery pack. For example, it may be possible to reduce battery pack degradation via a low pressure thermoplastic injection over molding of conductors. The over mold may provide and/or maintain separation between conductors, and it may also reduce the possibility of electrical communication between different conductors or mechanical components such as heat sinks, structural hardware, mounting hardware, and housings that could be referenced to another potential, ground for example. In this way, over molding of selected components of a battery pack may be useful to reduce the possibility of battery pack degradation.

The present description may provide several advantages. Specifically, the approach may reduce battery pack degradation. Further, the approach may be applied to existing battery pack designs. Further still, the approach may provide resistance to fluids and electrical charge.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description is related to a battery pack having electrical circuitry at least partially encapsulated via a fluid resistant over mold. The over mold protects the electrical circuitry from moisture and other external elements which may degrade the battery pack.

Figure 1:
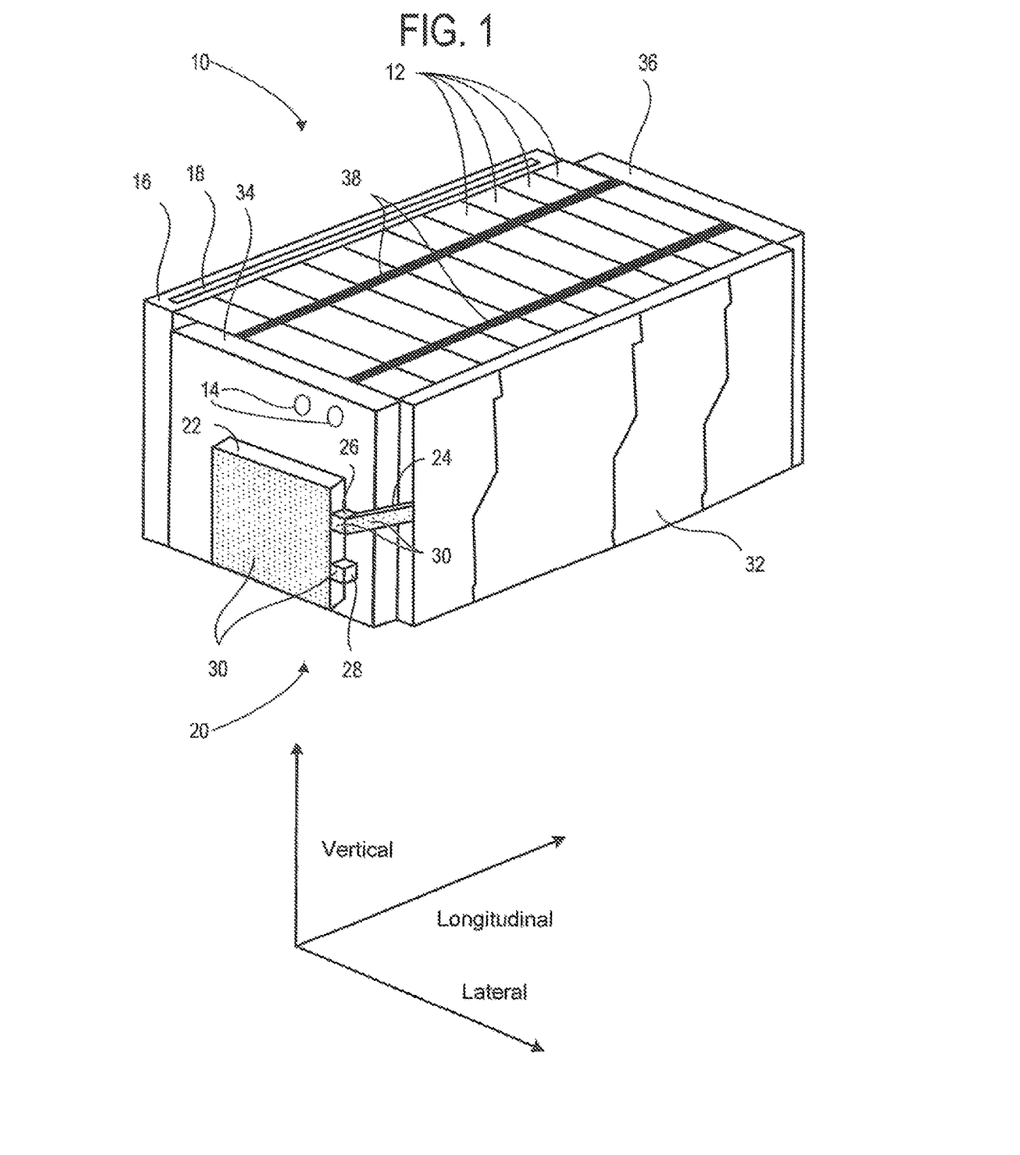
FIG. 1 shows an exemplary battery pack.
Figure 2:
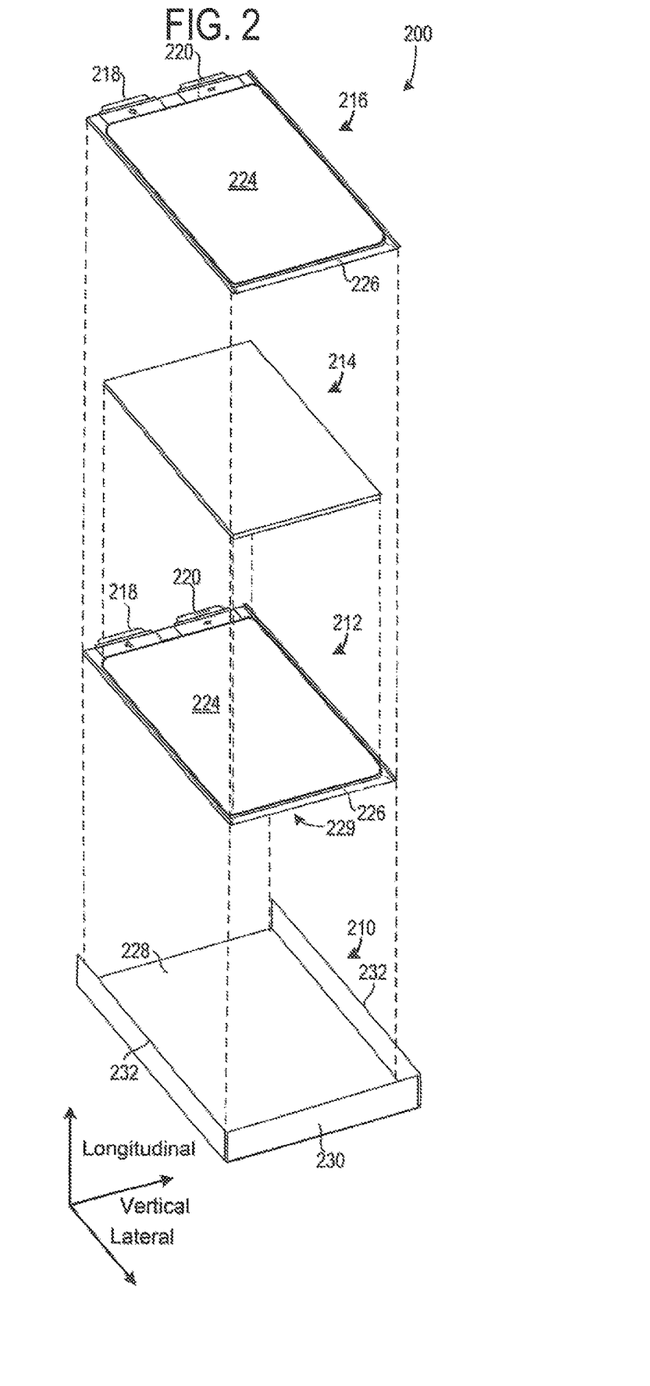
FIG. 2 shows an exploded schematic view of an example non-aqueous electrolyte battery cell included in the battery pack shown in FIG. 1.
Figure 3:
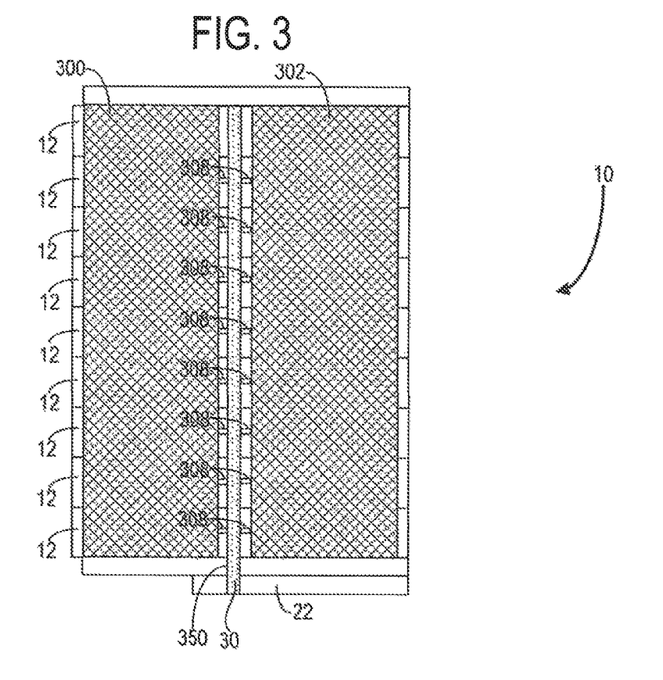
FIG. 3 shows a side view of the battery pack shown in FIG. 1.
Figure 4:
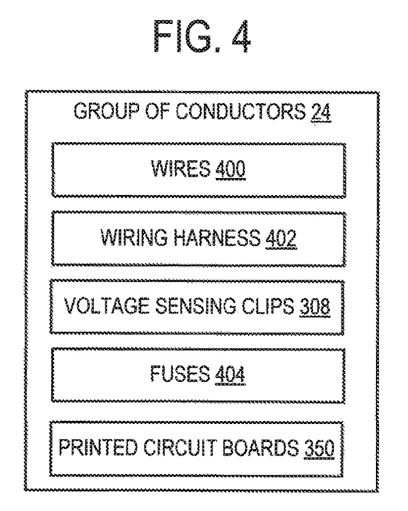
FIG. 4 shows a schematic depiction of the group of conductors included in the battery pack shown in FIG. 1.
Figure 5:
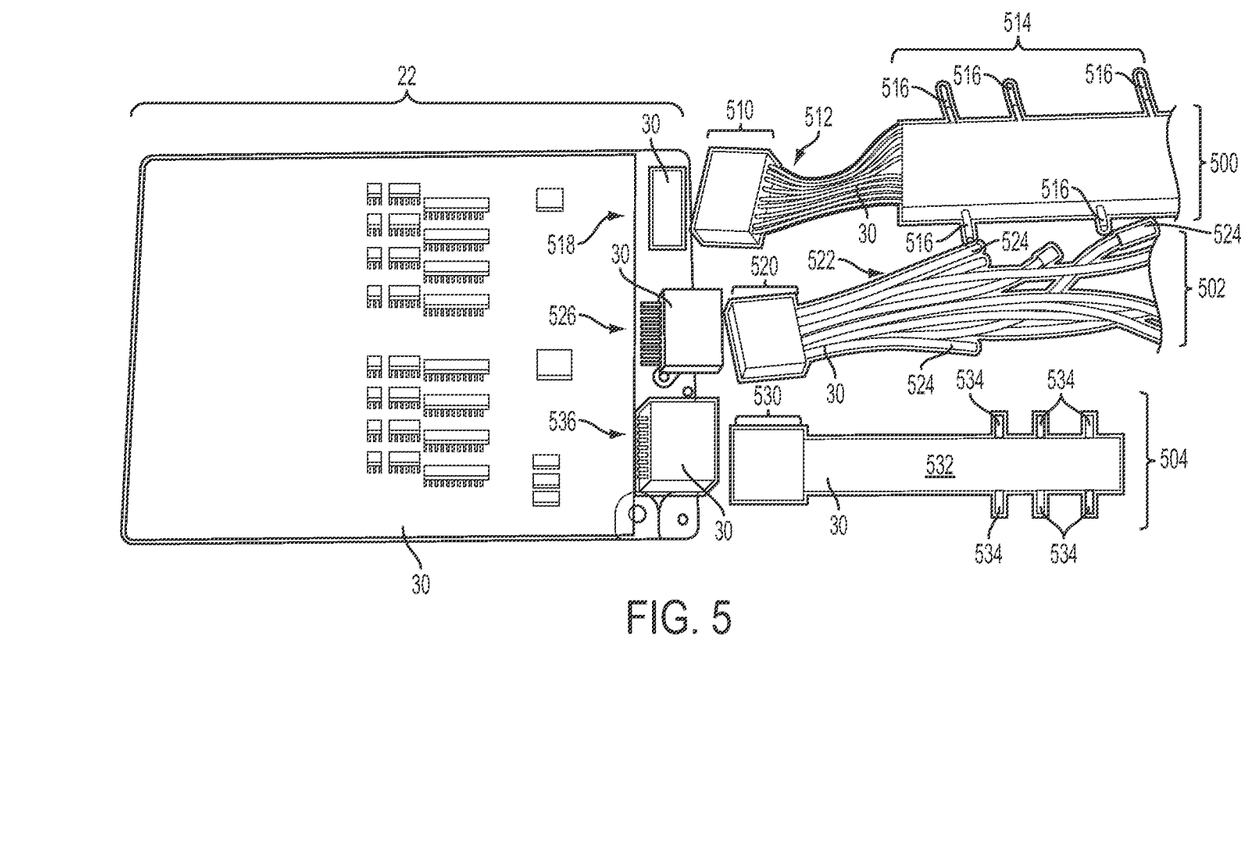
FIG. 5 show an example printed circuit board and groups of conductors included in the battery pack shown in FIG. 1.
Figure 6:
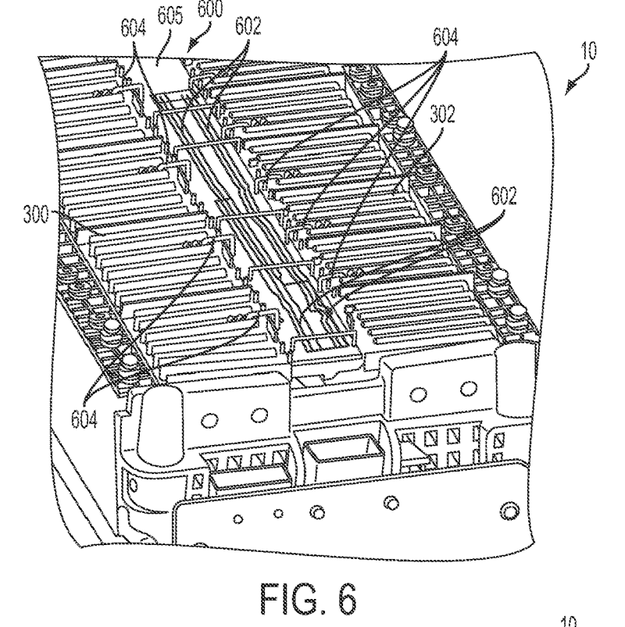
FIGS. 6-7 show example bus bars and conductors included in the battery pack, shown in FIG. 1.
Figure 7:
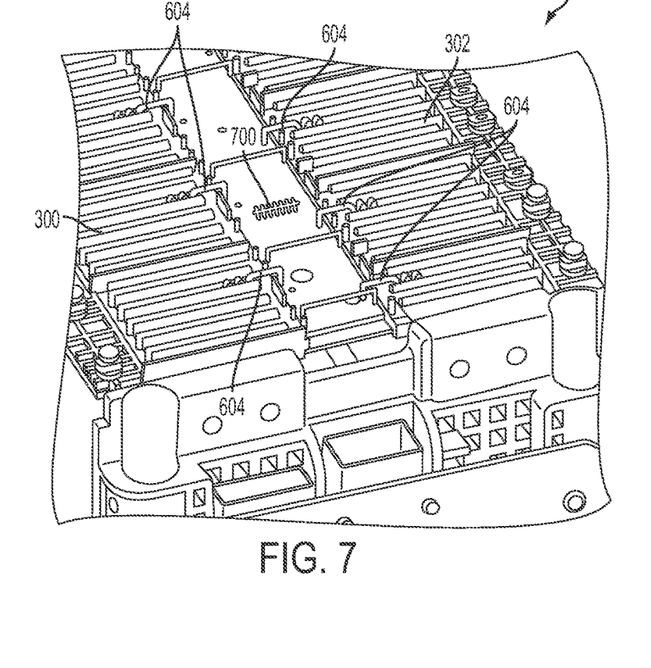
Figure 8:
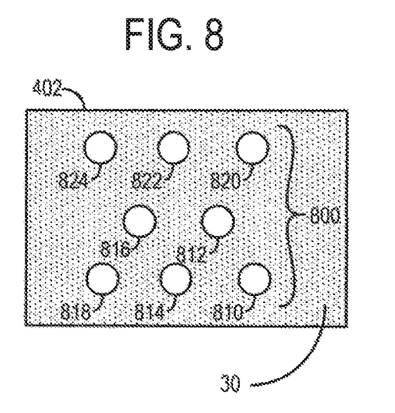
FIG. 8 shows an example wiring harness included in the group of conductors shown in FIG. 4.

FIG. 1 illustrates a battery pack and FIG. 2 illustrates a non-aqueous electrolyte battery cell that may be included in the battery pack shown in FIG. 1. FIG. 3 illustrates a side view of the battery pack shown in FIG. 1. FIG. 4 shows a schematic depiction of components in the group of conductors included in the battery pack shown in FIG. 1. FIG. 5 shows an example printed circuit board and groups of conductors that may be included in the battery pack shown in FIG. 1. FIGS. 6 and 7 show example bus bars and conductors that may be included in the battery pack shown in FIG. 1. FIG. 8 shows an example wiring harness that may be included in the battery pack shown in FIG. 1.

FIG. 1 shows an exploded view of a battery pack 10. The battery pack 10 includes a plurality of non-aqueous electrolyte battery cells 12. An example non-aqueous electrolyte battery cell is shown in detail in FIG. 2. The non-aqueous electrolyte battery cells 12 may be stacked. The stacked arrangement allows the battery cells to be densely packed in the battery pack. The battery pack 10 further includes output terminals 14. The output terminals 14 may be configured to electrically couple to external devices including other battery cell stacks, battery output terminals, and devices external to the battery pack. For example, the battery pack 10 may be coupled to an electric motor in a vehicle.

The battery back 10 further includes a liquid cooling circuit 16. The liquid cooling circuit 16 includes a liquid heat transfer medium 18. At least a portion of the liquid heat transfer medium may be comprised of water. In the example shown in FIG. 1 the liquid heat transfer medium is depicted via a rectangle. However, it will be appreciated that the liquid heat transfer medium may be flow through coolant conduits (not shown) traversing the battery pack 10. Additionally, the liquid cooling circuit 16 is in thermal communication with at least one of the plurality of non-aqueous electrolyte battery cells 12. The liquid cooling circuit 16 may also include a pump (not shown) configured to circulate coolant through the coolant conduits. The liquid cooling circuit 16 may also include a heat exchanger (not shown) configured to remove heat from the liquid heat transfer medium 18.

The battery pack 10 further includes electrical circuitry 20 in electrical communication with the plurality of non-aqueous electrolyte battery cells 12. The electrical circuitry 20 may include a printed circuit board 22. The printed circuit board 22 may be a charge monitor and balancing board, in some examples. The charge monitor and balancing board may be configured to monitor charge of battery cells 12 in the battery pack 10. Additionally, the charge monitor and balancing board may be configured to balance or reduce charge in the non-aqueous electrolyte battery cells 12 via resistors or transformers. Balancing battery cells refers to equalizing charge between a plurality of electrolyte battery cells. Further, the charge monitor and balancing board may be comprised of a microprocessor having random access memory, read only memory, input ports, real time clock, output ports, and a computer area network (CAN) port for communicating to systems outside of the battery pack 10. An example, charge monitor and balance board is shown in U.S. patent application Ser. No. 12/854,274, filed Aug. 11, 2010 and entitled "RECHARGEABLE BATTERY MANAGEMENT," which is hereby incorporated by reference for all purposes. The printed circuit board is generically depicted via a box. Another example is provided in U.S. Provisional Patent Application No. 61/293,861, filed Jan. 11, 2010 and entitled "SYSTEM AND METHOD FOR MONITORING AND BALANCING VOLTAGE OF INDIVIDUAL BATTERY CELLS WITHIN A BATTERY PACK," which is hereby incorporated by reference for all purposes. However, it will be appreciated that the printed circuit board 22 may have additional complexity.

The electrical circuitry 20 may further include a group of conductors 24 electrically coupling the printed circuit board 22 and the cells 12. The conductors 24 are depicted via a rectangular box. However, it will be appreciated that the conductors 24 may have greater complexity. Further in some examples, the group of conductors 24 may be in communication with printed circuit board 22. Still further in some examples, the group of conductors 24 may be arranged on one or more printed circuit boards that are separated from other conductors and each other via an over mold 30 and may be in electrical communication with printed circuit board 22. In still other examples, the group of conductors 24 may be included in a wire harness.

The group of conductors 24 may be coupled to an input connector 26 in the printed circuit board 22. Specifically, the input connector 26 may be configured to attach to a wiring harness or printed circuit board having the group of conductors 24 bundled therein. The printed circuit board 22 may further include an output connector 28 configured to attach to external circuitry, in some examples.

In still other examples, the group of conductors 24 may be arranged on one or more printed circuit boards 605 and wires 602 as shown in FIG. 6. The wires and/or conductors may be proximate to each other and are separated from each other and from other conductors via over mold 30. The wires and/or conductors on the printed circuit board 605 may be in communication with printed circuit board 22.

The battery pack 10 may further include a fluid resistant over mold 30, denoted via dots, encapsulating at least a portion of the electrical circuitry 20 away from the liquid heat transfer medium 18 or liquids that may unintentionally enter the battery pack. Specifically, the fluid resistant over mold 30 enables the liquid heat transfer medium 18 to be spaced apart from the electrical circuitry 20 and therefore electrical circuitry 20 is not adjacent to the liquid heat transfer medium 18. In one example, the over mold may be a thermoplastic over mold that is applied via a low pressure injection mold process. In this way, the electrical circuitry 20 is buffered (e.g., providing a high level of electrical, liquid, chemical, and heat resistance) from external elements, such as moisture. Thus, the electrical circuitry 20 may be buffered from liquid coolant in the liquid cooling circuit in the event of a leak from the cooling circuit. As a result, the likelihood of electrical communication between various components in the electrical circuitry 20 may be reduced, thereby decreasing the likelihood of battery pack degradation. Furthermore, when the fluid resistant over mold 30 is applied to battery pack components, electrostatic discharge (ESD) protection may not be used in certain parts of the manufacturing process for the battery pack, thereby simplifying manufacturing. However, ESD protection may be used in manufacturing if desired. Moreover, a cover for the printed circuit board 22 may not be used in the battery pack 10 when the fluid resistant over mold 30 is applied to battery pack components. However, in other examples a cover for the printed circuit board 22 may be used if desired.

Specifically, the fluid resistant over mold 30 may encapsulate at least a portion of the printed circuit board 22 which may include the input connector 26 and the output connector 28. Additionally, the fluid resistant over mold 30 may encapsulate at least a portion of the group of conductors 24 and/or a portion of the wiring harness bundling the conductors. In this way, the printed circuit board and the conductors may also be protected from external elements (e.g., water, dust, etc.). Additionally, the fluid resistant over mold 30 may provide a threshold distance between adjacent conductors in the group of conductors 24. In this way, the likelihood of adjacent conductors electrically communicating may be reduced.

The fluid resistant over mold 30 may be comprised of a thermoplastic, such as an electrically insulating thermoplastic. In some examples, the electrically insulating thermoplastic may be an electrostatic discharge insulator. Additionally, the fluid resistant over mold may be applied via a low pressure injection mold. Low pressure application of the fluid resistant over mold enables the cost of manufacturing to be reduced when compared to over molds that may need a higher pressure. In an example where a group of conductors 24 is arranged on two or more circuit boards, the fluid resistant over mold 30 may extend between the two or more printed circuit boards. Further in some examples, the fluid resistant over mold 30 may be applied to each of the aforementioned components in the electrical circuitry 20 individually or may be applied via a single application after interconnection of components. When the fluid resistant over mold 30 is applied via a single application, buffering of electrical circuits from external elements may be increased.

The battery pack 10 includes a bus cover 32. The bus cover 32 at least partially encloses buses electrically coupling the non-aqueous electrolyte battery cells 12. The battery pack may also include a front end cover 34 and a rear end cover 36. However, in other examples, the battery pack 10 may not include the front end cover 34 and/or the rear end cover 36. The battery cells may be strapped together by binding bands 38. The binding bands may be wrapped around the battery pack 10.

FIG. 2 shows an exploded view of a portion of an example non-aqueous electrolyte battery cell 200. The non-aqueous electrolyte battery cell 200 may be one of the plurality of non-aqueous electrolyte battery cells 12, shown in FIG. 1. As shown in FIG. 2, the non-aqueous electrolyte battery cell 200 is built in the order of a housing heat sink 210, battery cell 212, compliant pad 214, battery cell 216, and so on. However, it will be appreciated that other arrangement are possible. For example, the battery cell stack may be built in the order of a housing heat sink, battery cell, housing heat sink, etc. Further in some examples, the housing heat sink may be integrated into the battery cells. However in other examples, the housing heat sink may be omitted from the non-aqueous electrolyte battery cell 200.

Battery cell 212 includes cathode 218 and anode 220 for connecting to a bus bar, such as bus bar 300 or 302, shown in FIG. 3. The bus bar routes charge from one battery cell to another. The battery pack 10, shown in FIG. 1, may be configured with battery cells that are coupled in series and/or parallel. Bus bars couple like battery cell terminals when the battery cells are combined in parallel. For example, the positive terminal of a first battery cell is coupled to the positive terminal of a second battery cell to combine the battery cells in parallel. Bus bars also couple positive and negative terminal of battery cell terminals when it is desirable to increase the voltage of a battery pack. Continuing with FIG. 2, battery cell 212 further includes prismatic cell 224 that contains electrolytic compounds. Prismatic cell 224 is in thermal communication with cell heat sink 226. Cell heat sink 226 may be formed of a metal plate with the edges bent up 90 degrees on one or more sides to form a flanged edge. In the example of FIG. 2, two opposing sides include a flanged edge. However, other geometries are possible. Battery cell 212 is substantially identical to battery cell 216. Therefore, similar parts are labeled accordingly. Battery cells 212 and 216 are arranged with their terminals in alignment and exposed. In battery pack 10, shown in FIG. 1, the electric terminals are coupled to enable energy to be extracted from each cell in the battery pack. Returning to FIG. 2, compliant pad 214 is interposed between battery cell 212 and battery cell 216. However, in other examples the compliant pad may not be included in the battery cell stack.

Housing heat sink 210 may be formed by a metal plate having a base 228 with the edges bent up 90 degrees on one or more sides to form a flanged edge. In FIG. 2, longitudinally aligned edge 220 and vertically aligned edges 232 are bent flanged edges. As depicted, the housing heat sink is sized to receive one or more battery cells. In other words, one or more battery cells may be positioned within base 228. Thus, the flanged edges of the battery cells may be in contact with housing heat sink and underside 229 of battery cell 212 may be in contact with the base of the housing heat sink, facilitating heat transfer.

One of the longitudinally aligned edges 232 of the housing heat sink 210 may form a portion of the top side of battery pack 10, as shown in FIG. 1. Similarly, one of the longitudinally aligned edges 232 may form a portion of the bottom side of the battery pack 10, shown in FIG. 1. Thus, the longitudinally aligned edges of the housing heat sink may be in contact with the liquid cooling circuit 16 to increase heat transfer. In this way, heat may be transferred from the battery cells to the exterior of the battery pack 10.

FIG. 3 shows a side view of the battery pack 10 shown in FIG. 1 with the bus cover 32, shown in FIG. 1, removed. A first bus bar 300 and a second bus bar 302 extend down the length of the battery pack 10. The first bus bar 300 may be electronically coupled to terminals within each of the cells 12 in the battery pack. Likewise, the second bus bar 302 may be electronically coupled to terminals within each of the cells 12 in the battery pack 10.

Voltage sensing clips 308 are also depicted. The voltage sensing clips 308 may be included in the electrical circuitry 20, shown in FIG. 1, and specifically may be included in the group of conductors 24. The voltage sensing clips 308 are in electrical communication with the non-aqueous electrolyte battery cells 12 as well as the printed circuit board 22. The voltage sense clips 308 may be electrically coupled to one or more printed circuit boards 350. Alternatively, 350 may be a wire harness housing a plurality of wires electrically coupled to the printed circuit board 22, shown in FIG. 1. Continuing with FIG. 3, the voltage sensing clips 308 may be attached to positive and negative terminals in each of the non-aqueous electrolyte battery cells 12. In this way, cell voltage may be monitored via the printed circuit board 22. Furthermore, the voltage sensing clips 308 may be at least partially encapsulated via the fluid resistant over mold 30, in some examples.

FIG. 4 schematically depicts the components which may be included in the group of conductors 24, shown in FIG. 1. The group of conductors 24 may include wires 400, a wiring harness 402, voltage sensing clips 308, fuses 404, and the printed circuit boards 350. As previously discussed, the wiring harness 402 may bundle the wires and in some cases house the wires. The fuses 404 may be coupled to each of the wires 400 and are configured to fail at a predetermined threshold current, thereby acting as a sacrificial device to prevent damage to other components in the battery pack. Each of the components in the group of conductors 24 may have the fluid resistant over mold 30 covering at least of a portion of the included components.

FIG. 5 shows an example, printed circuit board 22 and three example groups of conductors 500, 502, and 504 which may be electrically coupled to the printed circuit board 22 via the connectors 518, 526, and 536 respectively. One of the groups of conductors 500, 502, and 504 may be the group of conductors 24 shown in FIGS. 1 and 4. Additionally, one of the connectors 518, 526, and 536 may be the input connector 26 shown in FIG. 1.

The first group of conductors 500 includes a wiring harness 510 bundling wires 512 and voltage sensing clips 516 attached to the ends of wires 512. The wiring harness 510 may include a conductor housing 514 housing wires 512. The wiring harness 510 is configured to attach to a connector 518 on the printed circuit board 22. The voltage sensing clips 516 may be coupled to the non-aqueous electrolyte battery cells 12 shown in FIGS. 1 and 3. The conductors are held in place by the conductor housing 514 and apart at a distance that is based on the distance between battery cells.

The second group of conductors 502 includes a wiring harness 520 bundling wires 522 and voltage sensing clips 524. The voltage sensing clips 524 may be electrically coupled to the non-aqueous electrolyte battery cells 12 shown in FIGS. 1 and 3. Additionally, the wiring harness 520 may be electrically coupled to the connector 526 on the printed circuit board 22.

The third group of conductors 504 includes a connector 530, one or more printed circuit boards 532, and voltage sensing clips 534. The third group of conductors 504 may further include components on the circuit board configured to electrically couple the voltage sensing clips 534 to the connector 530. The connector 530 is configured to electrically couple the third group of conductors 504 to the connector 536 included in the printed circuit board 22. It will be appreciated that one or more of the groups of conductors (500, 502, and 504) may also include fuses, as previously discussed with regard to FIG. 4. The fuses in the third group of conductors 504 may be discrete fuses or trace fuses.

As shown, the printed circuit board is encapsulated via the fluid resistant over mold 30. Furthermore, at least a portion of the components in the first, second, and/or third groups of conductors (500, 502, and 504) may be at least partially encapsulated by the fluid resistant over mold 30. In this way, the conductors can be buffered from liquids and other elements. Moreover, in some examples both the printed circuit board 22 and one of the groups of conductors (500, 502, and 504) may be encapsulated by a single application of the fluid resistant over mold 30. However, in other examples, the fluid resistant over mold 30 may be separately applied to the printed circuit board 22 and one of the groups of conductors (500, 502, and 504).

FIG. 6 shows another example battery pack 10. The bus bars 300 and 302 are illustrated. As previously discussed, the bus bars (300 and 302) may be electrically coupled to battery cells within the battery pack 10. A valley 600 extending between the bus bars (300 and 302) is shown. Printed circuit board 605 with conductors is positioned within the valley 600. As illustrated, wires 602 extend down the valley 600. The wires 602 may be included in the group of conductors 24, shown in FIG. 1. Additionally, voltage sensing clips 604 are also shown. The voltage sensing clips 604 may also be included in the group of conductors 24, shown in FIG. 1. As previously discussed, the voltage sensing clips 604 may be electrically coupled to cells within the battery pack 10.

FIG. 7 shows the example battery pack 10 shown in FIG. 6 without the wires 602, shown in FIG. 6. The voltage sensing clips 604 and the bus bars (300 and 302) are shown. Additionally, a wiring harness 700 which may bundle the wires 602, shown in FIG. 6, is also illustrated.

FIG. 8 shows a side view of an example wiring harness 402. As shown, the wiring harness 402 includes wires 800. The wires 800 are included in the group of conductors 24 attached to cells 12 in the battery pack 10, shown in FIG. 1. The wires 800 are positioned with respect to other wires so that less than a threshold voltage exists between adjacent wires. Over mold 30 separates and maintains separation between wires 800 of the wiring harness 402.

For example, consecutive wires (810, 812, 814, 816, 818, 820, 822, and 824) may have incrementally increased voltages applied to the wires via battery cell terminals. Therefore, the position of the consecutive wires (810, 812, 814, 816, 818, 820, 822, and 824) may be selected to reduce the difference in voltage between adjacent wires. In this way, the likelihood of electrical communication between wires having a large voltage differential may be reduced, thereby reducing the likelihood of battery pack degradation.

Figure 9:
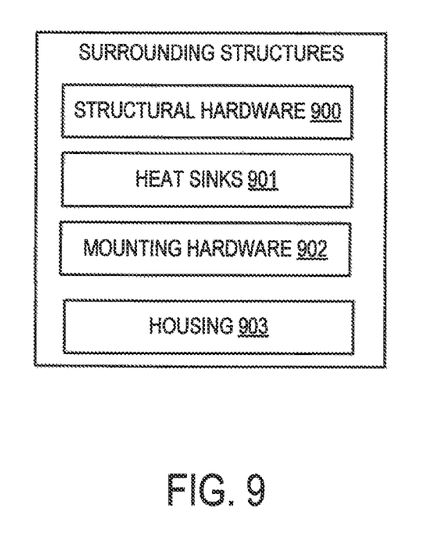
FIG. 9 shows an example group of surrounding structures which are buffered from conductors by the over mold.

Referring now to FIG. 9, surrounding structures proximate to over molded conductors and circuitry are shown. The over mold provides a buffer between electrical conductors and surrounding structures such as structural hardware 900, heat sinks 901, mounting hardware 902, and the battery housing 903. The structural hardware 900 may include battery cell supports and other structural members such as electrical component containment structures. Thus, in a condition where structural hardware or a battery housing is put in mechanical communication with over mold that buffers conductors of the battery pack, the over mold can provide an amount of electrical insulation and/or isolation between the conductors and the structure surrounding the conductors.

FIGS. 1-9 provide for a battery pack, comprising a plurality of non-aqueous electrolyte battery cells, a liquid cooling circuit including a liquid heat transfer medium, the liquid cooling circuit in thermal communication with at least one of the plurality of non-aqueous electrolyte battery cells, electrical circuitry in electrical communication with the plurality of non-aqueous electrolyte battery cells, and a fluid resistant over mold encapsulating at least a portion of the electrical circuitry away from the liquid heat transfer medium.

FIGS. 1-9 also provide for a battery pack where the fluid resistant over mold encapsulates a charge monitor and balancing board. FIGS. 1-9 also provide for a battery pack where the electrical circuitry includes fuses. FIGS. 1-9 also provide for a battery pack where the fluid resistant over mold encapsulates at least a portion of a plurality of conductors extending between at least two battery cells and a charge monitor and balancing board.

FIGS. 1-9 also provide for a battery pack where the fluid resistant over mold is comprised of a thermoplastic. FIGS. 1-9 also provide for a battery pack where the fluid resistant over mold is applied via a low pressure injection mold. FIGS. 1-9 also provide for a battery pack where at least a portion of the liquid heat transfer medium is comprised of water.

FIGS. 1-9 also provide for a battery pack, comprising a plurality of non-aqueous electrolyte battery cells, a liquid cooling circuit including a liquid heat transfer medium, the liquid cooling circuit in thermal communication with at least one of the plurality of non-aqueous electrolyte battery cells, a group of conductors in electrical communication with the plurality of non-aqueous electrolyte battery cells and a printed circuit board, and a fluid resistant over mold covering at least a portion of the group of conductors, the fluid resistant over mold positioned between the group of conductors and the liquid heat transfer medium.

FIGS. 1-9 also provide for a battery pack where the group of conductors are bundled into a wiring harness, and where the fluid resistant over mold covers at least a portion of the wiring harness. FIGS. 1-9 also provide for a battery pack where conductors within the group of conductors are positioned with respect to other conductors within the group of conductors so that less than a threshold voltage exists between adjacent conductors. FIGS. 1-9 also provide for a battery pack where the fluid resistant over mold provides a threshold distance between adjacent conductors. FIGS. 1-9 also provide for a battery pack where the group of conductors are arranged on at least one printed circuit board.

FIGS. 1-9 also provide for a battery pack where the group of conductors are arranged on two or more printed circuit boards and where the fluid resistant over mold extends between the two or more printed circuit boards. FIGS. 1-9 also provide for a battery pack where the printed circuit board is charge monitor and balancing board.

FIGS. 1-9 also provide for a battery pack where at least a portion of the charge monitor and balancing board is covered by the fluid resistant over mold. FIGS. 1-9 also provide for a battery pack where an input connector and an output connector of the charge monitor and balancing board are covered by the fluid resistant over mold.

FIGS. 1-9 provide for a battery pack, comprising a plurality of non-aqueous electrolyte battery cells, a liquid cooling circuit including a liquid heat transfer medium, the liquid cooling circuit in thermal communication with at least one of the plurality of non-aqueous electrolyte battery cells, a group of conductors in electrical communication with the plurality of non-aqueous electrolyte battery cells and a printed circuit board, and a fluid resistant over mold covering at least a portion of the group of conductors and maintaining positions of at least a portion of the group of conductors according to positions of at least a portion of the plurality of non-aqueous electrolyte battery cells.

FIGS. 1-9 also provide for a battery pack where the group of conductors are fused. FIGS. 1-9 also provide for a battery pack where at least a portion of the group of conductors are battery cell voltage sense conductors. FIGS. 1-9 also provide for a battery pack where the fluid resistant over mold is an electrically insulating thermoplastic.

FIGS. 1-9 also provide for a battery pack where the electrically insulating thermoplastic is an electrostatic discharge insulator. FIGS. 1-9 also provide for a battery pack further comprising a connector positioned between at least one of the group of conductors and the printed circuit board, and where the fluid resistant over mold covers the connector.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A battery pack, comprising:
   a plurality of non-aqueous electrolyte battery cells, each of the plurality of non-aqueous electrolyte battery cells comprising two terminals, where a valley extends along a length of the battery pack between the two terminals of each of the plurality of non-aqueous electrolyte battery cells, the valley positioned at a first side of the battery pack;
   a liquid cooling circuit including a liquid heat transfer medium, the liquid cooling circuit in thermal communication with at least one of the plurality of non-aqueous electrolyte battery cells;
   electrical circuitry in electrical communication with the plurality of non-aqueous electrolyte battery cells, the electrical circuitry including:
      a printed circuit board positioned at an exterior surface of a second side of the battery pack, where the second side of the battery pack is perpendicular to the first side of the battery pack, and where the second side of the battery pack is adjacent to the first side of the battery pack,
      a plurality of voltage sensing clips, where the plurality of voltage sensing clips is positioned at the first side of the battery pack, and where the plurality of voltage sensing clips is positioned within the valley, the plurality of voltage sensing clips electrically coupled to the printed circuit board, and
      a plurality of wires positioned within the valley, the plurality of wires being conductors, where the plurality of wires extends along the length of the battery pack, and where the plurality of wires further extends between the printed circuit board and the plurality of non-aqueous electrolyte battery cells, the plurality of wires wrapping around the battery pack from the first side of the battery pack to the second side of the battery pack; and
   a fluid resistant over mold encapsulating at least a portion of the electrical circuitry away from the liquid heat transfer medium, the fluid resistant over mold encapsulating at least a portion of the plurality of wires that is extended between at least one of the plurality of non-aqueous electrolyte battery cells and the printed circuit board and that is outside a surrounding structure of the battery pack, the fluid resistant over mold providing a buffer between at least the portion of the plurality of the wires and the surrounding structure of the battery pack.

2. The battery pack of claim 1, where the printed circuit board includes a charge monitor and balancing board, and where the fluid resistant over mold encapsulates the charge monitor and balancing board.

3. The battery pack of claim 1, wherein the cooling circuit is positioned at a third side of the battery pack, where the third side of the battery pack is opposite the first side of the battery pack.

4. The battery pack of claim 3, wherein the cooling circuit is in contact with a housing heat sink, wherein the housing heat sink retains one or more of the plurality of non-aqueous electrolyte battery cells.

5. The battery pack of claim 1, where the fluid resistant over mold is comprised of a thermoplastic.

6. The battery pack of claim 1, where the surrounding structure of the battery pack includes a front end cover at the second side of the battery pack, and where the front end cover is positioned between the printed circuit board and the plurality of non-aqueous electrolyte battery cells.

7. The battery pack of claim 1, further comprising output terminals at the second side of the battery pack.

8. A battery pack, comprising:
   a plurality of non-aqueous electrolyte battery cells, each of the plurality of non-aqueous electrolyte battery cells in the battery pack comprising a first terminal and a second terminal,
      where the first terminal and the second terminal of each of the plurality of non-aqueous electrolyte battery cells are positioned at a first side of the battery pack, where each of the plurality of non-aqueous electrolyte battery cells in the battery pack is coupled to a first bus bar and a second bus bar, where the plurality of non-aqueous electrolyte battery cells is electrically coupled to a printed circuit board, where the printed circuit board is positioned at an exterior of a surrounding structure at a second side of the battery pack, and where the second side of the battery pack extends in a plane perpendicular to the first side of the battery pack;

a liquid cooling circuit including a liquid heat transfer medium, the liquid cooling circuit in thermal communication with at least one of the plurality of non-aqueous electrolyte battery cells;

a plurality of voltage sensing clips that are in electrical communication with the plurality of non-aqueous electrolyte battery cells and the printed circuit board via a group of wires, where both the plurality of voltage sensing clips and the group of wires are positioned in a valley, the group of wires being conductors, and where the valley extends along a length of the battery pack, the valley formed between the first terminals and the second terminals at the first side of the battery pack, where the group of wires further extends from the valley at the first side of the battery pack to the printed circuit board at the second side of the battery pack, the group of wires wrapping around the battery pack from the first side of the battery pack to the second side of the battery pack; and a fluid resistant over mold positioned between the group of wires and an exterior surrounding structure of the battery pack, the fluid resistant over mold covering at least a portion of the group of wires that extends between at least one of the plurality of non-aqueous electrolyte battery cells and the printed circuit board and that is outside the surrounding structure of the battery pack, where the fluid resistant over mold is positioned between the group of wires and the liquid heat transfer medium and provides a buffer between the group of wires and the liquid heat transfer medium.

9. The battery pack of claim 8, where the group of wires is bundled into a wiring harness, the wiring harness positioned in the valley, and where the fluid resistant over mold covers at least a portion of the wiring harness.

10. The battery pack of claim 8, further comprising the liquid cooling circuit is positioned at a third side of the battery pack, where the third side of the battery pack is opposite the first side of the battery pack.

11. The battery pack of claim 8, where the fluid resistant over mold provides a threshold distance between adjacent wires.

12. The battery pack of claim 8, where the surrounding structure of the battery pack includes a battery housing.

13. The battery pack of claim 8, further comprising output terminals that are positioned on the second side of the battery pack.

14. The battery pack of claim 13, where the printed circuit board is a charge monitor and balancing board, and where the printed circuit board further includes an output connector for attaching to external circuitry.

15. The battery pack of claim 14, where at least a portion of the charge monitor and balancing board is covered by the fluid resistant over mold.

16. The battery pack of claim 15, where the printed circuit board further includes an input connector, the input connector coupling the printed circuit board and the group of wires.

17. A battery pack, comprising:

a plurality of non-aqueous electrolyte battery cells, each of the plurality of non-aqueous electrolyte battery cells comprising two terminals, where a valley extends a length of the battery pack between the two terminals of each of the plurality of non-aqueous electrolyte battery cells, where the two terminals of each of the plurality of non-aqueous electrolyte battery cells are positioned at a first side of the battery pack, and where the valley is positioned at the first side of the battery pack;

a wiring harness positioned in the valley;

a liquid cooling circuit including a liquid heat transfer medium, the liquid cooling circuit in thermal communication with at least one of the plurality of non-aqueous electrolyte battery cells;

a group of wires and a plurality of voltage sensing clips, where the group of wires and the plurality of voltage sensing clips are both positioned in the valley, and where the group of wires and the plurality of voltage sensing clips are both in electrical communication with the plurality of non-aqueous electrolyte battery cells and a printed circuit board, the printed circuit board positioned at an exterior surface of a second side of the battery pack, the second side of the battery pack extending in a plane perpendicular to the first side of the battery pack, where the second side of the battery pack is adjacent to the first side of the battery pack, and the group of wires being conductors, where the group of wires is positioned in the wiring harness; and a fluid resistant over mold covering at least a portion of the group of wires, the fluid resistant over mold maintaining positions of at least the portion of the group of wires according to positions of at least a portion of the plurality of non-aqueous electrolyte battery cells, where the fluid resistant over mold encapsulates at least a section of the group of wires, where the group of wires extends between at least one of the plurality of non-aqueous electrolyte battery cells and the printed circuit board, where the group of wires wraps around the battery pack from the first side of the battery pack to the second side of the battery pack, and where the fluid resistant over mold is outside a surrounding structure of the battery pack, the fluid resistant over mold providing a buffer between at least the section of the group of wires and the surrounding structure of the battery pack.

18. The battery pack of claim 17, where the group of wires is coupled to one or more fuses, and wherein the plurality of non-aqueous electrolyte battery cells is prismatic battery cells.

19. The battery pack of claim 17, further comprising the liquid cooling circuit, the liquid cooling circuit positioned at a third side of the battery pack, where the third side is opposite the first side of the battery pack.

20. The battery pack of claim 19, wherein the liquid coolant circuit is in contact with a housing heat sink, the housing heat sink comprising metal, where the housing heat sink includes a base and flanged edges, and where the housing heat sink retains one or more of the plurality of non-aqueous electrolyte battery cells.

* * * * *